US005586373A

United States Patent [19]

Eby et al.

[11] Patent Number: 5,586,373

[45] Date of Patent: Dec. 24, 1996

[54] CLAMP

[75] Inventors: Devon Eby, Nappanee; Dale Love, Goshen; James L. Reed, Nappanee, all of Ind.

[73] Assignee: Grrreat Creations, Inc., Nappanee, Ind.

[21] Appl. No.: 524,263

[22] Filed: Sep. 6, 1995

[51] Int. Cl.[6] .............................. A44B 21/00; F16B 7/00

[52] U.S. Cl. .............................. 24/525; 24/569; 269/249; 403/290

[58] Field of Search .............................. 24/525, 522, 514, 24/535, 569, 466; 269/249, 143; 403/290, 356

[56] References Cited

U.S. PATENT DOCUMENTS

| | | | |
|---|---|---|---|
| 292,207 | 1/1884 | Corbett | 269/249 |
| 1,497,107 | 6/1924 | Lasell | 269/249 |
| 3,469,810 | 9/1969 | Dorris | 24/525 |
| 3,495,431 | 2/1970 | Landon | 24/525 |
| 3,626,497 | 12/1971 | Lambert | 269/249 |
| 5,131,780 | 7/1992 | Love | 269/249 |

*Primary Examiner*—Victor N. Sakran
*Attorney, Agent, or Firm*—Baker & Daniels

[57] ABSTRACT

A clamp includes a pair of relatively movable clamping members carrying clamping pods for engaging articles and holding them together. One of the members includes an arm having larger and smaller cross-sectional portions with a bore extending therethrough. The other member includes an arm which slidably engages the arm of the other member through a tongue-and-groove connection. A bore in the arm of the other member is coaxial with the bore in the other member. A rotatable fastener extends through one of the boxes and is threadedly engaged with the other bore. The larger cross-sectional area stiffens the member at its weakest point thereby permitting materials such as plastic to be used in the manufacture of the clamp. The tongue-and-groove connection assures alignment of the members during clamping.

7 Claims, 2 Drawing Sheets

CLAMP

This invention relates to a clamp for securing a pick-up truck cap to the cargo box of a pick-up truck.

Pick-up truck caps are commonly secured to the cargo box of a pick-up truck by clamps positioned around the top of the pick-up cargo box and engaging the pick-up truck cap. Heretofore, such clamps were made of metal, because the design of prior art clamps resulted in fractures if the clamps are made of alternate materials, such as plastic. Furthermore, when installing prior art clamps, it is difficult to maintain alignment of the two clamping members as the clamps were tightening against the cargo box of the truck cap.

The present invention solves the aforementioned problem by providing a thickened portion of one of the clamping members where the fastening member or bolt extends through the clamping member and engages a threaded bore in the other clamping member. This reinforced portion sufficiently strengthens the member that tightening of the fastener to draw the clamping members against the cargo box and the truck cap does not generate sufficient stress to fracture the member. Accordingly, it is possible to manufacture the clamp from alternate materials, such as plastic, while still retaining sufficient strength to securely attach the pick-up cap to the pick-up cargo box. A sliding tongue-and-groove connection is provided between the clamping members to thereby orient the clamping members in the proper position as the members are tightened against the cargo box and the truck cap. This enables the user to quickly and easily install the clamps without worrying about maintaining alignment between the members.

These and other advantages of the present invention will become apparent from the following description, with reference to the accompanying drawings, in which.

Figure 2:
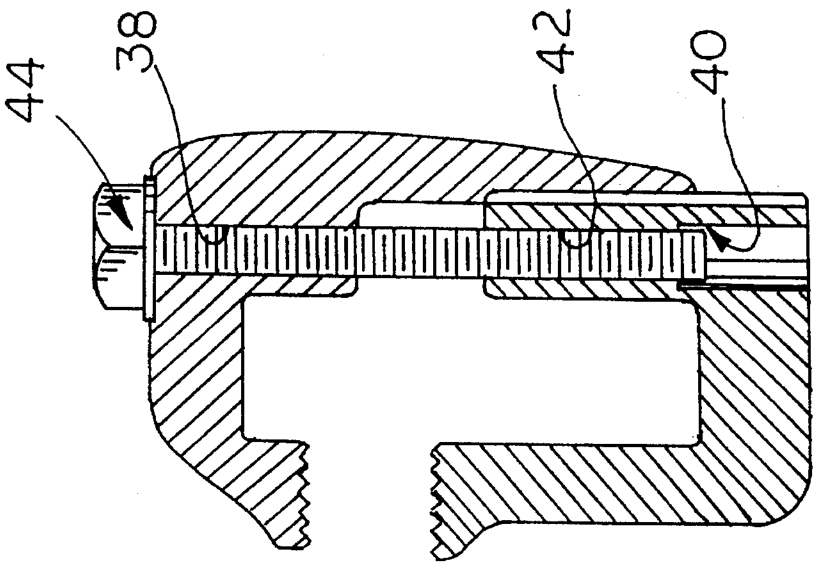
FIG. 2 is a cross-sectional view taken through the clamp illustrated in FIG. 1.
Figure 1:
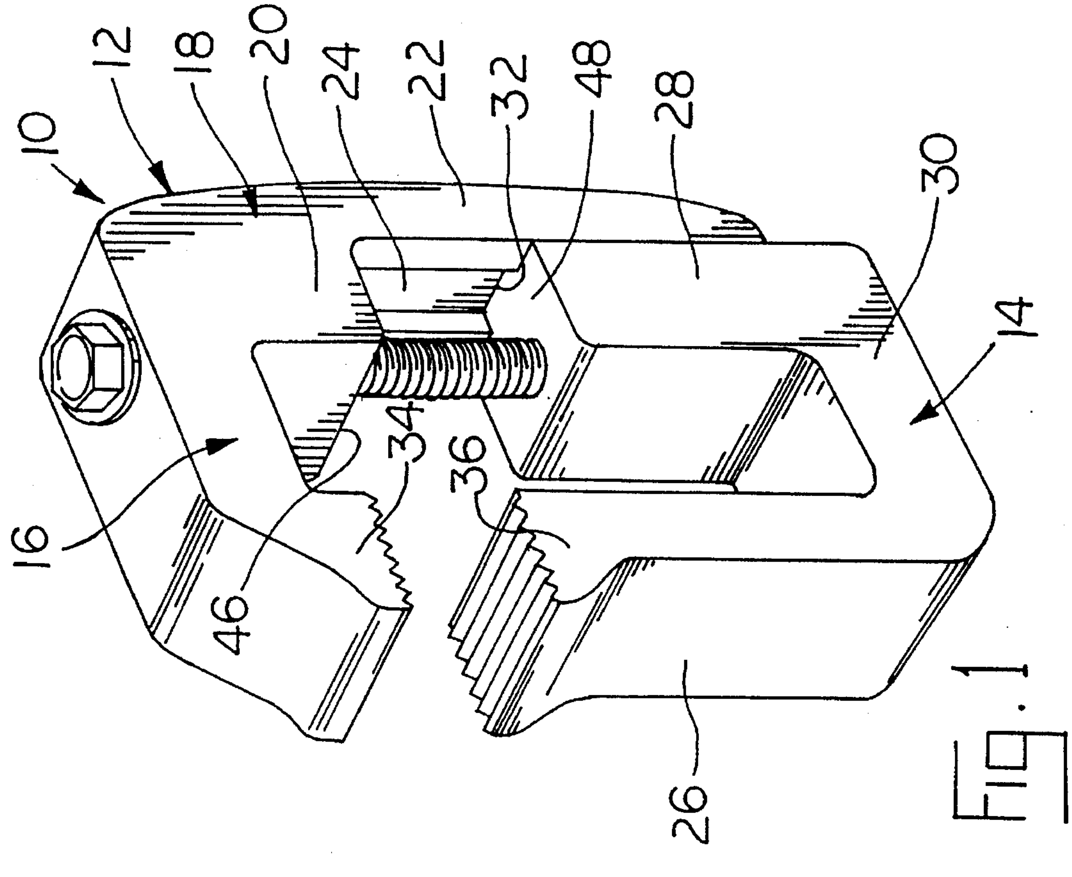
FIG. 1 is a view in perspective of a clamp made pursuant to the teachings of the present invention.
Figure 4:
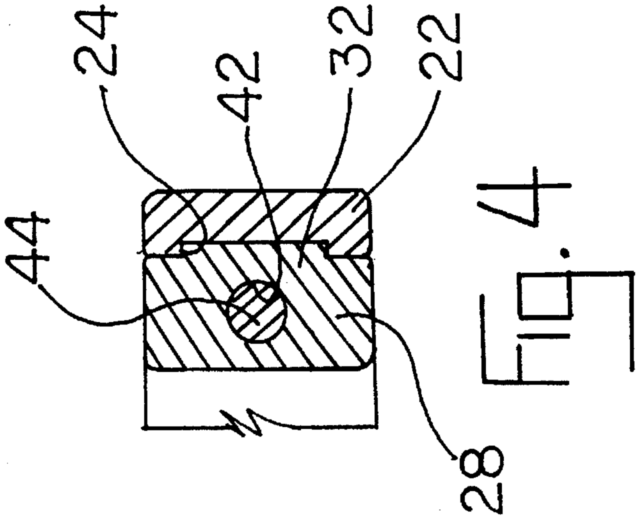
FIG. 4 is a fragmentary cross-sectional view taken substantially along lines 4—4 of FIG. 3.

Referring now to the drawings, a clamp generally indicated by the numeral 10 includes a pair of relatively movable clamping members 12, 14. Member 12 includes a pair of arms 16, 18, with the arm 18 including a larger cross-sectional portion 20 and a smaller cross-sectional portion 22. The smaller cross-sectional portion 22 is provided with a groove 24. The member 14 includes a pair of arms 26, 28 connected by a connecting portion 30. The arm 28 includes a projecting portion or tongue 32 that is slidably received in the groove 24. The arm 16 of the member 12 and the arm 26 of the member 14 carry clamping pods 34, 36, respectively, which are opposed to one another when the tongue 32 is slidably engaged in the groove 24.

The larger cross-sectional portion 20 of the arm 18 is provided with a bore 38 extending therethrough and the arm 28 is provided with a bore 40 having a threaded portion 42. The bore 40 and the bore 38 are coaxial when the tongue 32 is engaged in the groove 24. A threaded, rotatable adjustable fastener, such as a bolt 44, extends through the bore 38 and is threadably engaged with threaded section 42 of the bore 40. Accordingly, upon rotation of the adjustable fastener 44, the members 12 and 14 and, therefore the clamping pods 34 and 36, are moved toward and away from one another. The larger and smaller portions 20, 22 of the arm 18 define a shoulder 46 therebetween through which bore 38 extends; the shoulder 46 faces end surface 48 of the arm 28. Upon rotation of the fastener 44, the distance between the shoulder 46 and surface 48 is such that the clamping pods 34, 36 are brought in engagement with one another to affect clamping before the shoulder 46 contacts the surface 48.

Figure 3:
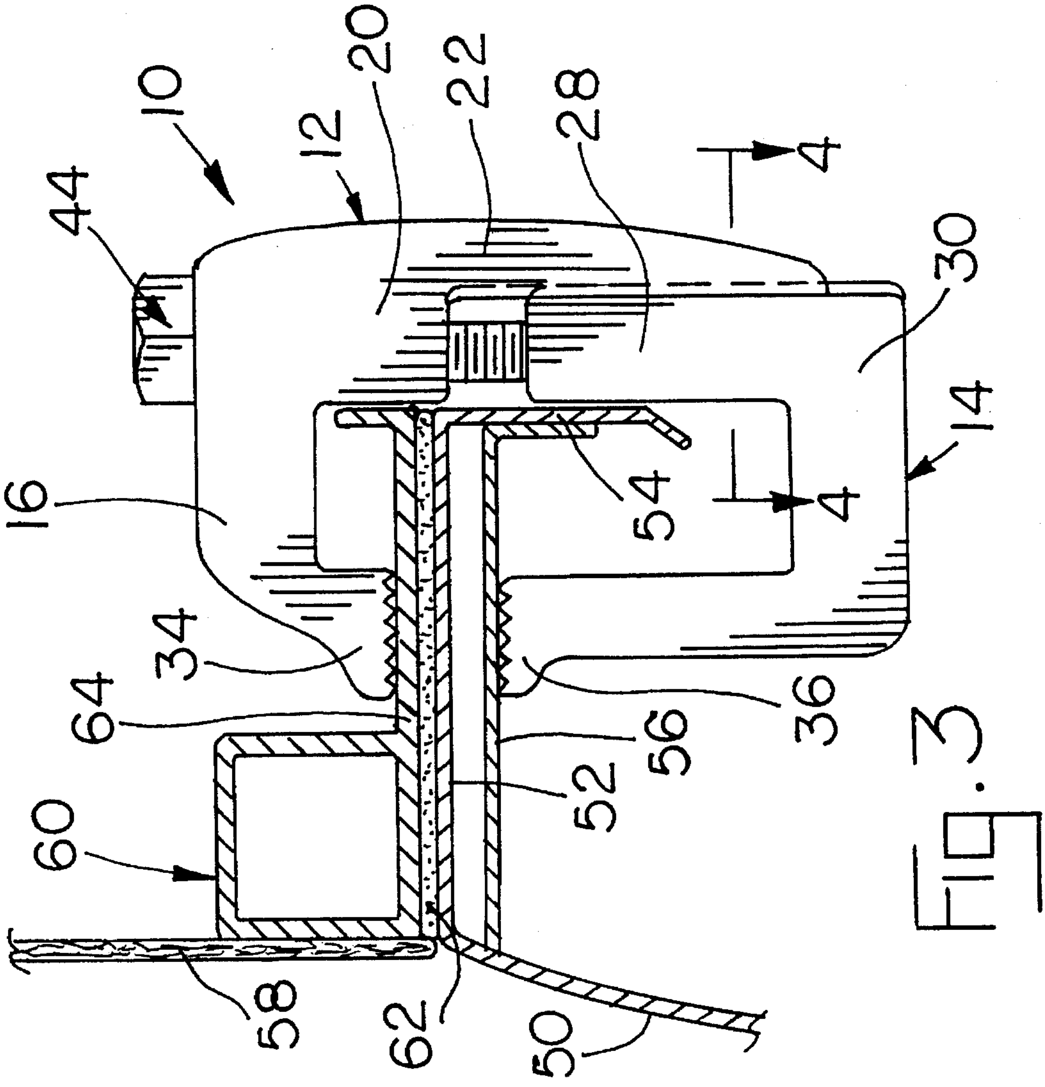
FIG. 3 is an elevational view of the clamp illustrated in FIGS. 1 and 2 illustrating the clamp in an operative position securing a truck cap to the cargo box of a pick-up truck, the truck cap and cargo box being illustrated in cross-section.

Referring now to FIG. 3, a conventional pick-up truck cargo box includes a side rail 50, which includes transversely extending portion 52 and a turned over portion 54 which extends substantially parallel at the portion 50. An inner support flange 56 is secured to both the side rail 50 and the portion 54. A conventional truck cap includes a side panel 58, which may be fiberglass or other similar material, to which is secured a mounting pad 60 which extends parallel to laterally extending portion 52 of the cargo box. The mounting pad 60 includes a clamping member 64. As illustrated in FIG. 3, the clamp 10 of the present invention is used to secure the truck cap to the cargo box. A number of the clamps 10 are be spaced around the cargo box, and the illustration FIG. 3 is a typical cross-section showing the mounting of any of the clamps 10 used to secure the truck cap to the cargo box. Accordingly, the fastener 44 is adjusted to bring the clamping pod 34 into engagement with clamping surface 64 and to bring the clamping pod 36 into engagement with the clamping member 56. The fastener 44 can then be tightened to slightly deform the resilient material 62, thereby firmly securing the cap to the cargo box of the pick-up truck.

We claim:

1. A clamp comprising a pair of relatively movable clamping members made of a material other than metal, a pair of clamping pods, each of said members including a pair of arms, one arm of each member carrying one of the clamping pods such that the clamping pod of one member opposes the clamping pod of the other member, the other arm of said one member being stepped to define a larger cross-section portion and a smaller cross-section portion with a shoulder therebetween, said smaller portion extending from said larger cross-section portion, the other arm of said other member slidably engaging the smaller portion of the other arm of said one member, said one arm of said one member extending from said larger portion, a bore extending through said larger portion substantially parallel to said smaller portion, and adjustable fastening means extending through said bore and then parallel to said smaller portion thereby interconnecting said other arm of said other member and said other arm of said one member for moving the members relative to one another whereby adjustment of the fastening means moves the clamping pods toward and away from one another.

2. Clamp as claimed in claim 1, wherein said other arm of the other member defines another bore, said bores being coaxial when the other arm of the other member slidably engages the smaller portion of the other arm of the one member, said fastener extending through said bores to adjustably join said members.

3. Clamp as claimed in claim 2, wherein one of said bores includes a threaded portion, said fastener being a threaded bolt engaging the threaded portion.

4. Clamp as claimed in claim 2, wherein the sliding engagement between the other arm of the other member and the larger portion of the other arm of the one member is defined by a tongue-and-groove connection.

5. Clamp as claimed in claim 1, wherein the sliding engagement between the other arm of the other member and the larger portion of the other arm of the one member is defined by a tongue-and-groove connection.

6. A clamp comprising a pair of relatively movable clamping members, a pair of clamping pods, each of said members including a pair of arms, one arm of each member carrying one of the clamping pods such that the clamping pod of one member opposes the clamping pod of the other member, the other arm of said one member slidably engaging the other arm of the other member through a tongue-and-groove connection engaged between said members, and adjustable fastening means interconnecting said other arm of said other member and said other arm of said one member for moving the members relative to one another whereby adjustment of the fastening means moves the clamping pods toward and away from one another, each of said members including bores, said bores being coaxial when the tongue-and-groove connection is engaged, said fastener being a rotatable member extending through said bores and having threads engaging a threaded portion of one of said bores.

7. Clamp as claimed in claim 6, wherein said fastener is a rotatable member which extends between said members, one of said members having a threaded bore engaging threads carried on the fastener.

* * * * *